United States Patent
Yang et al.

(10) Patent No.: US 7,650,011 B2
(45) Date of Patent: Jan. 19, 2010

(54) VISUAL TRACKING USING INCREMENTAL FISHER DISCRIMINANT ANALYSIS

(75) Inventors: Ming-Hsuan Yang, Mountain View, CA (US); Ruei-Sung Lin, Urbana, IL (US)

(73) Assignee: Honda Motor Co., Inc., Tokyo (JP)

( * ) Notice: Subject to any disclaimer, the term of this patent is extended or adjusted under 35 U.S.C. 154(b) by 316 days.

(21) Appl. No.: 11/179,280

(22) Filed: Jul. 11, 2005

(65) Prior Publication Data
US 2006/0023916 A1 Feb. 2, 2006

Related U.S. Application Data

(60) Provisional application No. 60/586,598, filed on Jul. 9, 2004, provisional application No. 60/625,501, filed on Nov. 5, 2004.

(51) Int. Cl.
*G06K 9/00* (2006.01)
(52) U.S. Cl. ............ 382/103; 382/223; 382/224
(58) Field of Classification Search ......... 382/103, 382/223–224
See application file for complete search history.

(56) References Cited

U.S. PATENT DOCUMENTS

| | | | |
|---|---|---|---|
| 5,960,097 | A | 9/1999 | Pfeiffer et al. |
| 6,047,078 | A | 4/2000 | Kang |
| 6,226,388 | B1 * | 5/2001 | Qian et al. ............ 382/103 |
| 6,236,736 | B1 | 5/2001 | Crabtree et al. |
| 6,295,367 | B1 | 9/2001 | Crabtree et al. |
| 6,337,927 | B1 * | 1/2002 | Elad et al. ............ 382/225 |
| 6,363,173 | B1 * | 3/2002 | Stentz et al. ............ 382/195 |
| RE37,668 | E | 4/2002 | Etoh |
| 6,400,831 | B2 | 6/2002 | Lee et al. |
| 6,539,288 | B2 | 3/2003 | Ishida et al. |
| 6,580,810 | B1 | 6/2003 | Yang et al. |
| 6,683,968 | B1 * | 1/2004 | Pavlovic et al. ............ 382/103 |
| 6,757,423 | B1 | 6/2004 | Amini |
| 6,810,079 | B2 * | 10/2004 | Itokawa ............ 375/240.08 |
| 6,870,945 | B2 | 3/2005 | Schoepflin et al. |

(Continued)

FOREIGN PATENT DOCUMENTS

WO       WO 00/48509 A1    8/2000

(Continued)

OTHER PUBLICATIONS

Collins, R.T. et al., "On-Line Selection of Discriminative Tracking Features," Carnegie Mellon University, 2003, pp. 1-14.

(Continued)

*Primary Examiner*—Charles Kim
*Assistant Examiner*—John W Lee
(74) *Attorney, Agent, or Firm*—Fenwick & West LLP; Mark Duell

(57) ABSTRACT

Visual tracking over a sequence of images is formulated by defining an object class and one or more background classes. The most discriminant features available in the images are then used to select a portion of each image as belonging to the object class. Fisher's linear discriminant method is used to project high-dimensional image data onto a lower-dimensional space, e.g., a line, and perform classification in the lower-dimensional space. The projection function is incrementally updated.

21 Claims, 8 Drawing Sheets

U.S. PATENT DOCUMENTS

| | | | |
|---|---|---|---|
| 6,999,600 B2 * | 2/2006 | Venetianer et al. | 382/103 |
| 7,003,134 B1 | 2/2006 | Covell et al. | |
| 2001/0048753 A1 | 12/2001 | Lee et al. | |
| 2004/0208341 A1 | 10/2004 | Zhou et al. | |

FOREIGN PATENT DOCUMENTS

| | | | |
|---|---|---|---|
| WO | WO 03/049033 A1 * | 6/2003 | |

OTHER PUBLICATIONS

International Search Report and Written Opinion, PCT/US04/38189, Mar. 2, 2005.

"Pose Invariant Affect Analysis Using Thin-Plate Splines," To appear Int. Conference on Pattern Recognition, Cambridge, UK, Aug. 2004, [online] [Retrieved on Oct. 9, 2006] Retrieved from the Internet<URL:http://cvrr.ucsd.edu/publications/2004/RAAS-ICPR2004.pdf>.

Black, Michael J. et al., "EigenTracking: Robust Matching and Tracking of Articulated Objects Using a View-Based Representation," International Journal of Compuber Vision, 1998, pp. 63-84, vol. 26, No. 1.

International Search Report and Written Opinion, PCT/US05/24582, Feb. 9, 2006, 8 pages.

Tipping, Michael E. et al., "Probabilistic Principal Component Analysis," Journal of the Royal Statistical Society, Series B, Sep. 27, 1998, pp. 611-622, vol. 61, part 3.

* cited by examiner (a)                               (b)

VISUAL TRACKING USING INCREMENTAL FISHER DISCRIMINANT ANALYSIS

CROSS REFERENCE TO RELATED APPLICATIONS

This application claims priority under 35 USC § 119(e) to U.S. Provisional Patent Application No. 60/586,598, filed Jul. 9, 2004, entitled "Object Tracking Using Incremental Fisher Discriminant Analysis," which is incorporated by reference herein in its entirety.

This application claims priority under 35 USC § 119(e) to U.S. Provisional Patent Application No. 60/625,501, filed Nov. 5, 2004, entitled "Adaptive Discriminative Generative Model and its Applications," which is incorporated by reference herein in its entirety.

This application is also related to U.S. patent application Ser. No. 11/179,881, filed on Jul. 11, 2005, entitled "Adaptive Discriminative Generative Model and Application to Visual Tracking," which is incorporated by reference herein in its entirety.

This application is also related to U.S. patent application Ser. No. 10/989,986, filed on Nov. 15, 2004, entitled "Adaptive Probabilistic Visual Tracking with Incremental Subspace Update," which is incorporated by reference herein in its entirety.

FIELD OF THE INVENTION

The present invention generally relates to the field of computer-based visual perception, and more specifically, to adaptive probabilistic discriminative generative modeling.

BACKGROUND OF THE INVENTION

In the field of visual perception, many applications require separating a target object or image of interest from a background. In particular, motion video applications often require an object of interest to be tracked against a static or time-varying background.

The visual tracking problem can be formulated as continuous or discrete-time state estimation based on a "latent model." In such a model, observations or observed data encode information from captured images, and unobserved states represent the actual locations or motion parameters of the target objects. The model infers the unobserved states from the observed data over time.

At each time step, a dynamic model predicts several possible locations (e.g., hypotheses) of the target at the next time step based on prior and current knowledge. The prior knowledge includes previous observations and estimated state transitions. As each new observation is received, an observation model estimates the target's actual position. The observation model determines the most likely location of the target object by validating the various dynamic model hypotheses. Thus, the overall performance of such a tracking algorithm is limited by the accuracy of the observation model.

One conventional approach builds static observation models before tracking begins. Such models assume that factors such as illumination, viewing angle, and shape deformation do not change significantly over time. To account for all possible variations in such factors, a large set of training examples is required. However, the appearance of an object varies significantly as such factors change. It is therefore daunting, if not impossible, to obtain a training set that accommodates all possible scenarios of a visually dynamic environment.

Another conventional approach combines multiple tracking algorithms that each track different features or parts of the target object. Each tracking algorithm includes a static observation model. Although each tracking algorithm may fail under certain circumstances, it is unlikely that all will fail simultaneously. This approach adaptively selects the tracking algorithms that are currently robust. Although this improves overall robustness, each static observation model must be trained, i.e., initialized, before tracking begins. This severely restricts the application domain and precludes application to previously unseen targets.

Thus, there is a need for improved observation accuracy to provide improved tracking accuracy, and to robustly accommodate appearance variation of target objects in real time, without the need for training.

SUMMARY OF THE INVENTION

Visual tracking over a sequence of images is formulated by defining an object class and one or more background classes. The most discriminant features available in the images are then used to select a portion of each image as belonging to the object class. This approach is referred to as classification.

Fisher's linear discriminant (FLD) method is used to project high-dimensional image data onto a lower-dimensional space, e.g., a line, and perform classification in the lower-dimensional space. A projection function maximizes the distance between the means of the object class and background class or classes while minimizing the variance of each class.

FLD requires that the samples in each class are clustered, that is, that the appearance variance within each class is relatively small. In practice, while this constraint likely holds for the object class, it does not hold for the single background class. Accordingly, one embodiment of the present invention comprises one object class and multiple background classes. However, the number of background classes required is an issue. Another embodiment overcomes this issue by using one class per sample to model the background. Yet another embodiment extends FLD by incrementally updating the projection function. Experimental results confirm the effectiveness of the invention.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
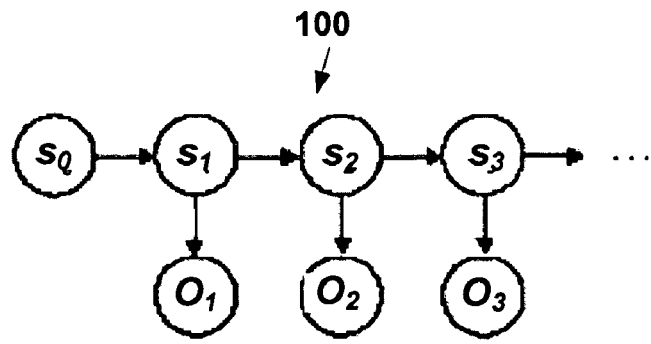
FIG. 1 illustrates a latent model used in one embodiment of the present invention.

The visual tracking problem is illustrated schematically in FIG. 1. At each time step t an observed image region or frame $o_t$ is observed in sequence, and the state variable $s_t$ corresponding to the target object is treated as unobserved. The motion of the object from one frame to the next is modeled based upon the probability of the object appearing at $s_t$ given that it was just at $s_{t-1}$. In other words, the model represents possible locations of the object at time t, as determined prior to observing the current image frame. The likelihood that the object is located at a particular possible position is then determined according to a probability distribution. The goal is to determine the most probable a posteriori object location.

The visual tracking problem is formulated in this step as a recursive state estimation problem. A description of this can be found in M. Isard and A. Blake, Contour Tracking by Stochastic Propagation of Conditional Density, *Proceedings of the Fourth European Conference on Computer Vision*, LNCS 1064, Springer Verlag, 1996, which is incorporated by reference herein in its entirety, and in U.S. patent application Ser. No. 10/989,986, entitled "Adaptive Probabilistic Visual Tracking with Incremental Subspace Update," which was referenced above.

Based on $o_t$, the image region observed at time t, $O_t = \{o_1, \ldots, o_t\}$ is defined as a set of image regions observed from the beginning to time t. A visual tracking process infers state $s_t$ from observation $O_t$, where state $s_t$ contains a set of parameters referring to the tracked object's 2-D position, orientation, and scale in image $o_t$. Assuming a Markovian state transition, this inference problem is formulated with the recursive equation $$p(s_t|O_t) = k p(o_t|s_t) \int p(s_t|s_{t-1}) p(s_{t-1}|O_{t-1}) ds_{t-1} \qquad (1)$$

where k is a constant, and $p(o_t|s_t)$ and $p(s_t|s_{t-1})$ correspond to observation and dynamic models, respectively, to be described below.

In equation (1), $p(s_{t-1}|O_{t-1})$ is the state estimation given all the prior observations up to time t−1, and $p(o_t|s_t)$ is the likelihood of observing image $o_t$ at states $s_t$. For visual tracking, an ideal distribution of $p(s_t|O_t)$ should peak at $o_t$, i.e., $s_t$ matching the observed object's location $o_t$. While the integral in equation (1) predicts the regions where the object is likely to appear given all the prior observations, the observation model $p(o_t|s_t)$ determines the most likely state that matches the observation at time t.

According to this embodiment, $p(o_t|s_t)$ measures the probability of observing $o_t$ as a sample generated by the target object class. $O_t$ is an image sequence, and if the images are acquired at a high frame rate, the difference between $o_t$ and $o_{t-1}$ is expected to be small, even though object's appearance might vary according to different of viewing angles, illuminations, and possible self-deformation. Instead of adopting a complex static model to learn $p(o_t|s_t)$ for all possible $o_t$, a simpler adaptive model is sufficient to account for the appearance changes. In addition, since $o_t$ and $o_{t-1}$ are most likely similar, and since computing $p(o_t|s_t)$ depends on $p(o_{t-1}|s_{t-1})$, the prior information $p(o_{t-1}|s_{t-1})$ is used to enhance the distinction between the object and its background in $p(o_t|s_t)$.

Figure 2:
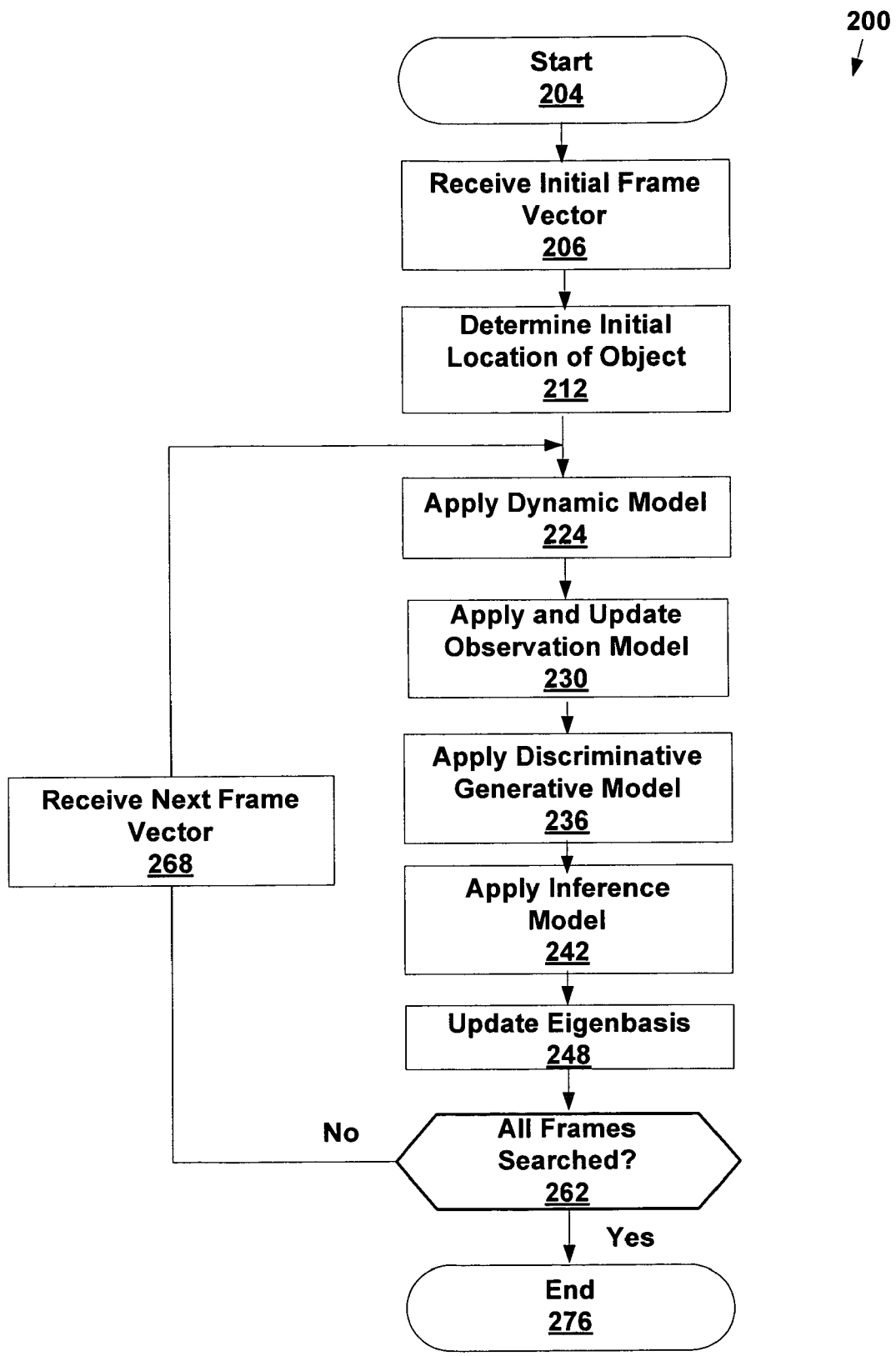
FIG. 2 is a flowchart illustrating one embodiment of the method of the invention.

Referring now to FIG. 2, one embodiment of a method of solving equation (1) is depicted. An initial frame vector is received 206. This frame vector includes one element per pixel, where each pixel comprises a description of brightness, color etc. Then the initial location of the target object is determined 212. This may be accomplished either manually or through automatic means. An example of automatic object location determination is face detection. One embodiment of face detection is illustrated in patent application Ser. No. 10/858,878, Method, Apparatus and Program for Detecting an Object, which is incorporated by reference herein in its entirety. Such an embodiment informs the tracking algorithm of an object or area of interest within an image.

Figure 3:
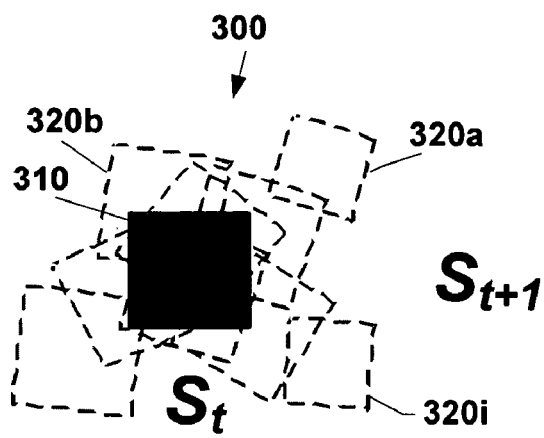
FIG. 3 illustrates a dynamic model used in one embodiment of the present invention.

Returning to FIG. 2, the present invention applies 224 a dynamic model to predict possible locations of the target object in the next frame, $s_{t+1}$, based upon the location within the current frame, $s_t$, according to a distribution $p(S_t|S_{t-1})$. This is shown conceptually in FIG. 3, including location in the current frame 310 and possible locations in the next frame 320(i). In other words, a probability distribution provided by the dynamic model encodes beliefs about where the target object might be at time t, prior to observing the respective frame and image region. According to the applied 224 dynamic model, $s_t$, the location of the target object at time t, is a length-5 vector, s=(x,y,θ,w,h), that parameterizes the windows position (x,y), angular orientation (θ) and width and height (w,h).

Then, an image observation model is applied 230. This model is based on probabilistic principle components analysis (PPCA). A description of this can be found in M. E. Tipping and C. M. Bishop, Probabilistic principle components analysis, *Journal of the Royal Statistical Society, Series B*, 1999, which is incorporated by reference herein in its entirety.

Applying 230 the observation model determines $p(o_t|s_t)$, the probability of observing $o_t$ as a sample being generated by the target object class. Note that $O_t$ is a sequence of images, and if the images are acquired at high frame rate, it is expected that the difference between $o_t$ and $o_{t-1}$ is small though object's appearance might vary according to different of viewing angles, illuminations, and possible self-deformation. Instead of adopting a complex static model to learn $p(o_t|s_t)$ for all possible $o_t$, a simpler adaptive model suffices to account for appearance changes. In addition, since $o_t$ and $o_{t-1}$ are most likely similar, and since computation of $p(o_t|s_t)$ depends on the prior information $p(o_{t-1}|s_{t-1})$, such prior information can be used to enhance the distinction between the object and the background in $p(o_t|s_t)$.

Referring again to FIG. 2, a discriminative-generative model (DGM) is applied 236 to improve the estimated target object location. The development of the DGM follows the work of Tipping and Bishop, which was referenced above. The latent model of FIG. 1 relates an n-dimensional appearance vector y to an m-dimensional vector of latent variables x in accordance with equation (2):

$$y = Wx + \mu + \epsilon \quad (2)$$

In equation (2), y and x are analogous to o and s, respectively, W is a n×m projection matrix associating y and x, $\mu$ is the mean of y, and $\epsilon$ is additive noise. As is commonly assumed in factor analysis and other graphical models, the latent variables x are independent with unit variance, $x \sim N(0, I_m)$, where $I_m$ is the m-dimensional identity matrix, and $\epsilon$ is zero mean Gaussian noise, $\epsilon \sim N(0, \sigma^2 I_n)$. A description of this is in An Introduction to Multivariate Statistical Analysis, T. W. Anderson, Wiley, 1984, and Learning in Graphical Models, Michael I. Jordan, MIT Press, 1999, which are incorporated by reference herein in their entirety.

Since x and $\epsilon$ are both Gaussian random vectors, it follows that the vector y also has a Gaussian distribution, $y \sim N(\mu, C)$, where $C = WW^T + \sigma^2 I$ and $I_n$ is an n-dimensional identity matrix. Together with equation (2), the generative observation model is defined by $$p(o_t|s_t) = p(y_t|W, \mu, \epsilon) \sim N(y_t|\mu, WW^T + \sigma^2 I_n) \quad (3)$$

This latent variable model follows the form of probabilistic principle component analysis, and its parameters can be estimated from a set of example images. Given a set of image frames $Y = \{y_1, \ldots, y_N\}$, the covariance matrix of Y is denoted as $$S = \frac{1}{N} \sum (y - \mu)(y - \mu)^T.$$

$\{\lambda_i | i=1, \ldots, N\}$ are the eigenvalues of S arranged in descending order, i.e., $\lambda_i \geq \lambda_j$ if i<j. Also, the diagonal matrix $\Sigma_m = \text{diag}(\lambda_1, \ldots, \lambda_m)$ is defined, and $U_m$ are the eigenvectors that correspond to the eigenvalues in $\Sigma_m$. Tipping and Bishop show that the maximum likelihood estimate of $\mu$, W and $\epsilon$ can be obtained by $$\mu = \frac{1}{N} \sum_{i=1}^{N} y_i, \quad W = U_m(\Sigma_m - \sigma^2 I_m)^{1/2} R, \quad \sigma^2 = \frac{1}{n-m} \sum_{i=m+1}^{n} \lambda_i \quad (4)$$

where R is an arbitrary m×m orthogonal rotation matrix.

According to this embodiment, the single, linear PPCA model described above suffices to model gradual appearance variation, since the model parameters W, $\mu$, and $\sigma^2$ may be dynamically adapted to account for appearance change.

Figure 4:
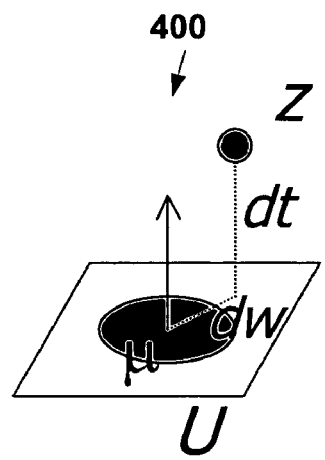
FIG. 4 illustrates an observation model used in one embodiment of the present invention.

The log-probability that a vector y is a sample of this generative appearance model can be computed from equation (4) as $$L(W, \mu, \sigma^2) = -\frac{1}{2}(N \log 2\pi + \log|C| + \bar{y}^T C^{-1} \bar{y}) \quad (5)$$

where $\bar{y} = y - \mu$. Neglecting the constant terms, the log-probability is determined by $\bar{y}^T C^{-1} \bar{y}$. Together with $C = WW^T + \sigma^2 I_n$ and equation (4), it follows that $$\bar{y}^T C^{-1} \bar{y} = \bar{y}^T U_m \sum_m^{-1} U_m^T \bar{y} + \frac{1}{\sigma^2} \bar{y}^T (I_n - U_m U_m^T) \bar{y} \quad (6)$$

$$\bar{y}^T U_m \Sigma_m^{-1} U_m^T \bar{y} \quad (7)$$

is the distance of y within the subspace spanned by $U_m$, which is represented by dw in FIG. 4.

$$\bar{y}^T (I_n - U_m U_m^T) \bar{y} \quad (8)$$

is the shortest distance from y to this subspace, as represented by dt in FIG. 4. Usually $\sigma$ is set to a small value, and consequently the probability will be determined solely by distance dt. From equation (6), if the value of $\sigma$ is set much smaller than the actual value, the distance dt (represented by equation (8)) will be favored and dw (represented by equation (7)) will be ignored, thereby rendering an inaccurate estimate. The choice of $\sigma$ is even more of a factor in situations where the appearance changes dynamically. As a consequence of this sensitivity, one embodiment of the present invention adaptively adjusts $\sigma$ according to newly arrived samples. Further discussion of the initialization and adjustment of $\sigma$ is given below.

As discussed above, it is expected that the target object's appearance does not change significantly from $o_{t-1}$ to $o_t$. Therefore, the observation at $o_{t-1}$ can be used to improve the likelihood measurement corresponding to $o_t$. That is, a set of samples (e.g., image patches) is drawn, parameterized by $\{s_{t-1}^i | i=1, \ldots, k\}$ in $o_{t-1}$ that have large $p(o_{t-1}|s_{t-1}^i)$, but low posterior $p(s_{t-1}^i|O_{t-1})$. These are treated as the negative samples (i.e., samples that are not generated from the class of the target object) that the generative model is likely to confuse as positive samples (generated from the class of the target object) at $O_t$.

Given a set of image samples $Y' = \{y^1, \ldots, y^k\}$, where $y^i$ is the appearance vector collected in $o_{t-1}$ based on state parameter $s_{t-1}^i$, a linear projection $V^*$ can be determined that projects Y' onto a subspace such that the likelihood of Y' in the subspace is minimized. Let V be a p×n matrix, and since $p(y|W, \mu, \sigma)$ is a Gaussian distribution, $p(Vy|V, W, \mu, \sigma) \sim N(V\mu, VCV^T)$ is a also a Gaussian distribution. The log likelihood is computed by $$L(V, W, \mu, \sigma,) = -\frac{k}{2}(p \log(2\pi) + \log|VCV^T| + tr((VCV^T)^{-1} VS'V^T)) \quad (9)$$

$$\text{where } S' = \frac{1}{k} \sum_{i=1}^{k} (y^i - \mu)(y^i - \mu)^T.$$

To facilitate the following analysis, it is assumed that V projects Y to a one-dimensional space, i.e., p=1 and $V = v^T$, and thus $$L(V, W, \mu, \sigma) = -\frac{k}{2}\left(\log(2\pi) + \log|v^T C v| + \frac{v^T S' v}{v^T C v}\right) \quad (10)$$

$v^T C v$ is the variance of the object samples in the projected space. A constraint, e.g., $v^t C v = 1$, is imposed to ensure that the minimum likelihood solution of v does not increase the variance in the projected space. By letting $v^T C v = 1$, the optimization problem becomes $$v^* = \arg\max_{\{v|v^T C v=1\}} v^T S' v = \arg\max_v \frac{v^T S' v}{v^T C v} \quad (11)$$

In equation (11), v is a projection that maintains the target object's samples in the projected space (i.e., the positive samples) close to μ (with the constraint that variance $v^T C v = 1$), while keeping negative samples in Y' away from μ. The optimal value of v is the generalized eigenvector of S' and C that corresponds to largest eigenvalue. In a general case, it follows that $$V^* = \arg\max_{\{V|VCV^T=I\}} |VS'V^T| = \arg\max_v \frac{|VS'V^T|}{|VCV^T|} \quad (12)$$

where V* can be obtained by solving a generalized eigenvalue problem of S' and C. By projecting observation samples onto a lower-dimensional subspace, the discriminative power of the generative model is enhanced. Advantageously, this reduces the time required to compute probabilities, which represents a critical improvement for real time applications like visual tracking.

Figure 5:
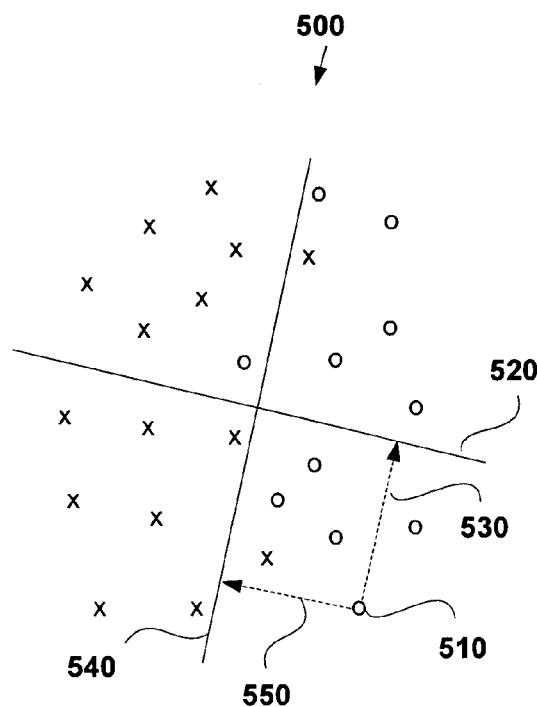
FIG. 5 illustrates positive and negative examples and their projections onto lines according to a discriminative-generative model used in one embodiment of the present invention.

Understanding of the projection v and its optimal value may be informed by reference to FIG. 5. Positive and negative samples in two-dimensional space are represented by "O" and "X" respectively. The samples, such as representative sample 510, may projected 530 and 550 onto lines 520 and 540, respectively. Line 540 represents a poor choice, since there will be low discrimination between positive and negative samples. This is shown conceptually by the projection shown in FIG. 6(a). Line 520 is a much better choice, since there will generally be much better separation of the projections of positive and negative samples, as illustrated in FIG. 6(b).

Figure 6:
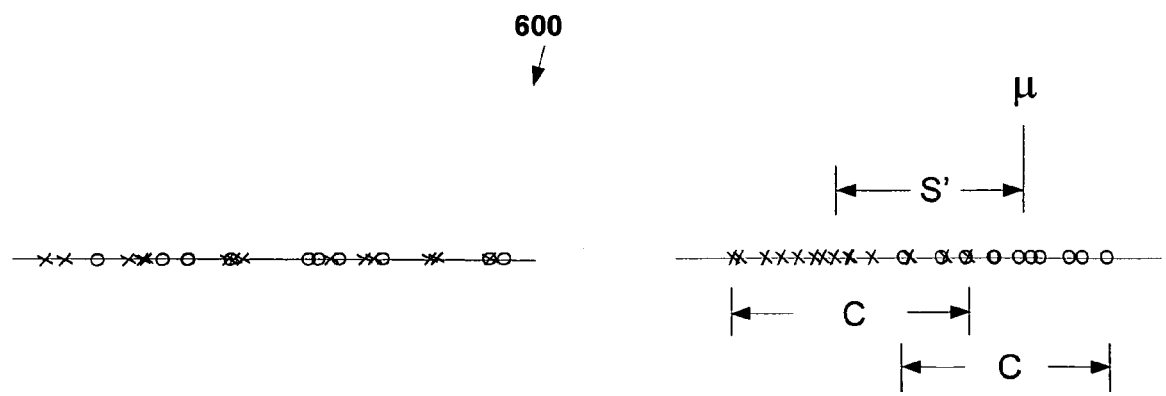
FIG. 6a illustrates poor discrimination of positive and negative samples.
FIG. 6b illustrates good discrimination of positive and negative samples, and in-class and between-class scatter.

FIG. 6(b) illustrates the meanings of C and S' according to a hypothetical one-dimensional example exhibiting very good discrimination. C corresponds to the variance of positive or negative sample clusters, taken as separate classes. This is referred to as "in-class scatter." S' corresponds to the separation between the positive and negative clusters, and is referred to as "between-class scatter." Thus, V* corresponds to the linear projection that maximizes the ratio of between-class scatter to in-class scatter.

The computation of the projection matrix V depends on matrices C and S'. S' may be updated as follows. Let $$u_{Y'} = \frac{1}{k}\sum_{i=1}^{k} y^i \text{ and } S_{Y'} = \frac{1}{k}\sum_{i=1}^{k}(y^i - \mu_{Y'})(y^i - \mu_{Y'})^T; \text{ then}$$

-continued $$S' = \frac{1}{k}\sum_{i=1}^{k}(y^i - \mu)(y^i - \mu)^T = S_{Y'} + (\mu - \mu_{Y'})(\mu - \mu_{Y'})^T \quad (13)$$

Given S' and C, V may be computed by solving a generalized eigenvalue problem. If $S' = A^T A$ and $C = B^T B$ are decomposed, then V can be more efficiently determined using generalized singular value decomposition (SVD). By denoting $U_{Y'}$ and $\Sigma_{Y'}$ as the SVD of $S_{Y'}$, it follows that by defining $A = [U_{Y'} \Sigma_{Y'}^{1/2} | (\mu - \mu_{Y'})]^T$ and $B = [U_m \Sigma_m^{1/2} | \sigma^2 I]^T$, then $S' = A^T A$ and $C = B^T B$.

V can be computed by first performing a QR factorization:

$$\begin{bmatrix} A \\ B \end{bmatrix} = \begin{bmatrix} Q_A \\ Q_B \end{bmatrix} R \quad (14)$$

and computing the singular value decomposition of $Q_A$ according to $$Q_A = U_A D_A V_A^t \quad (15)$$

which yields $V = R^{-1} V_A$. The rank of A is usually small in vision applications, and V can be computed efficiently, thereby facilitating the tracking process. A description of the method used in the above derivation can be found in G. H. Golumb and C. F. Van Loan, *Matrix Computations*, Johns Hopkins University Press, 1996, which is incorporated by reference herein in its entirety.

Returning to FIG. 2, the inference model discussed above is applied 242, based on the preceding steps, and according to equation (1). Since the appearance of the target object or its illumination may be time varying, and since an Eigenbasis is used for object representation, the Eigenbasis is preferably continually updated 248 from the time-varying covariance matrix. This problem has been studied in the signal processing community, where several computationally efficient techniques have been proposed in the form of recursive algorithms. A description of this is in B. Champagne and Q. G. Liu, "Plane rotation-based EVD updating schemes for efficient subspace tracking," IEEE Transactions on Signal Processing 46 (1998), which is incorporated by reference herein it its entirety. In this embodiment, a variant of the efficient sequential Karhunen-Loevei algorithm is utilized to update the Eigenbasis, as explained in A. Levy and M. Lindenbaum, "Sequential Karhunen-Loeve basis extraction and its application to images," IEEE Transactions on Image Processing 9 (2000), which is incorporated by reference herein it its entirety. This in turn is based on the classic R-SVD method. A description of this is in G. H. Golub and C. F. Van Loan, "Matrix Computations," The Johns Hopkins University Press (1996), which is incorporated by reference herein in its entirety.

One embodiment of the present invention then determines 262 whether all frames of a motion video sequence have been processed. If not, the method receives 268 the next frame vector, and steps 224-256 are repeated.

Having described some of the features of one embodiment of the tracking algorithm, additional aspects of this embodiment are now noted. The algorithm is based on a maximum likelihood estimate that determines the most probable location of the target object at the current time, given all observations up to that time. This is described by $s_t^* = \arg\max_{s_t}$ $p(s_t|O_t)$. It is assumed that the state transition is a Gaussian distribution, i.e., $$p(s_t|s_{t-1}) \sim N(s_{t-1}, \Sigma_s) \quad (16)$$

where $\Sigma_s$ is a diagonal matrix. According to this distribution, the tracking algorithm then draws N samples, or state vectors, $S_t = \{c_1, \ldots, c_N\}$ that represent the possible locations of the target. $y_t^i$ is the appearance vector of $o_t$, and $Y = \{y_t^1, \ldots y_t^N\}$ is a set of appearance vectors that correspond to the set of state vectors $S_t$. The posterior probability that the tracked object is at $c_i$ in video frame $o_t$ is then defined as $$p(s_t=c_i|O_t) = \kappa p(y_t^i|V,W,\mu,\sigma) p(s_t=c_i|s_{t-1}^*) \quad (17)$$

where $\kappa$ is a constant. Therefore, $s_t^* = \arg\max_{c_i \in s_t} p(s_t=c_i|O_t)$.

Once $s_t^*$ is determined, the corresponding observation $y_t^*$ will be a new example to update W and $\mu$. Appearance vectors $y_t^i$ with large $p(y_t^i|V,W,\mu,\sigma)$ but whose corresponding state parameters $c_i$ are away from $s_t^*$ will be used as new examples to update V. The tracking algorithm assumes $o_1$ and $s_1^*$ are given (through object detection, as discussed above), and thus obtains the first appearance vector $y_1$ which in turn is used as the initial value of $\mu$. However, V and W are unknown at the outset. When initial values of V and W are not available, the tracking algorithm is based on template matching, with $\mu$ being the template. The matrix W is computed after a small number of appearance vectors are observed. When W is available, V can be computed and updated accordingly.

As discussed above, it is difficult to obtain an accurate initial estimate of $\sigma$. Consequently, $\sigma$ is adaptively updated according to $\epsilon_m$ in W. $\sigma$ is initially set to a fraction, e.g., 0.1, of the smallest eigenvalues in $\epsilon_m$. This ensures the distance measurement in equation (6) will not be biased to favor either dw or dt.

Figure 7:
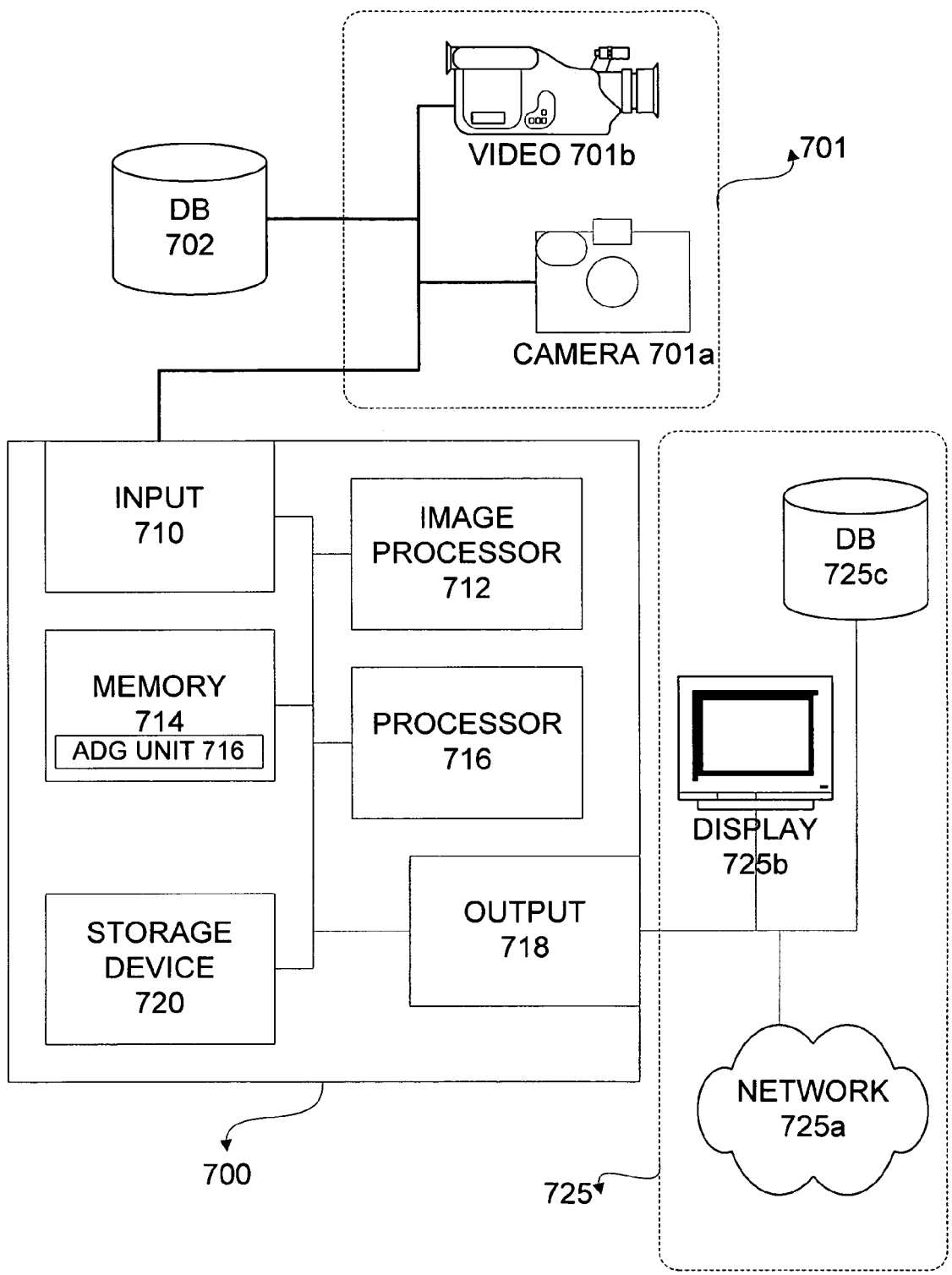
FIG. 7 illustrates one embodiment of a computer system for implementing the invention.

Now referring to FIG. 7, a system according to one embodiment of the present invention is shown. Computer system 700 comprises an input module 710, a memory device 714, a processor 716, and an output module 718. In an alternative embodiment, an image processor 712 can be part of the main processor 716 or a dedicated device to pre-format digital images to a preferred image format. Similarly, memory device 714 may be a standalone memory device, (e.g., a random access memory chip, flash memory, or the like), or an on-chip memory with the processor 716 (e.g., cache memory). Likewise, computer system 700 can be a stand-alone system, such as, a server, a personal computer, or the like. Alternatively, computer system 700 can be part of a larger system such as, for example, a robot having a vision system; a security system (e.g., airport security system), or the like.

According to this embodiment, computer system 700 comprises an input module 710 to receive the digital images O. The digital images may be received directly from an imaging device 701, for example, a digital camera 701a (e.g., robotic eyes), a video system 701b (e.g., closed circuit television), image scanner, or the like. Alternatively, the input module 710 may be a network interface to receive digital images from another network system, for example, an image database, another vision system, Internet servers, or the like. The network interface may be a wired interface, such as, a USB, RS-232 serial port, Ethernet card, or the like, or may be a wireless interface module, such as, a wireless device configured to communicate using a wireless protocol, e.g., Bluetooth, WiFi, IEEE 802.11, or the like.

An optional image processor 712 may be part of the processor 716 or a dedicated component of the system 700. The image processor 712 could be used to pre-process the digital images O received through the input module 710 to convert the digital images to the preferred format on which the processor 716 operates. For example, if the digital images received through the input module 710 come from a digital camera 710a in a JPEG format and the processor is configured to operate on raster image data, image processor 712 can be used to convert from JPEG to raster image data.

The digital images O, once in the preferred image format if an image processor 712 is used, are stored in the memory device 714 to be processed by processor 716. Processor 716 applies a set of instructions that when executed perform one or more of the methods according to the present invention, e.g., dynamic model, observation model, and the like. In one embodiment this set of instructions is stored in the Adaptive Discriminative Generative (ADG) unit 716 within memory device 714. While executing the set of instructions, processor 716 accesses memory device 714 to perform the operations according to methods of the present invention on the image data stored therein.

Processor 716 tracks the location of the target object within the input images, I, and outputs indications of the tracked object's identity and location through the output module 718 to an external device 725 (e.g., a database 725a, a network element or server 725b, a display device 725c, or the like). Like the input module 710, output module 718 can be wired or wireless. Output module 718 may be a storage drive interface, (e.g., hard-drive or optical drive driver), a network interface device (e.g., an Ethernet interface card, wireless network card, or the like), or a display driver (e.g., a graphics card, or the like), or any other such device for outputting the target object identification and/or location.

The tracking algorithm with discriminative-generative model was tested with numerous experiments. To examine whether the algorithm was able to adapt and track objects in dynamic environments, videos exhibiting appearance deformation, large illumination change, and large pose variations were recorded. All image sequences consisted of 320×240 pixel grayscale videos, recorded at 30 frames/second and 256 gray-levels per pixel. The forgetting term was empirically selected as 0.85, and the batch size for update was set to 5 as a trade-off of computational efficiency and effectiveness of modeling appearance change in the presence of fast motion. A description of the forgetting term can be found in Levy and Lindenbaum, which was cited above.

Figure 8:
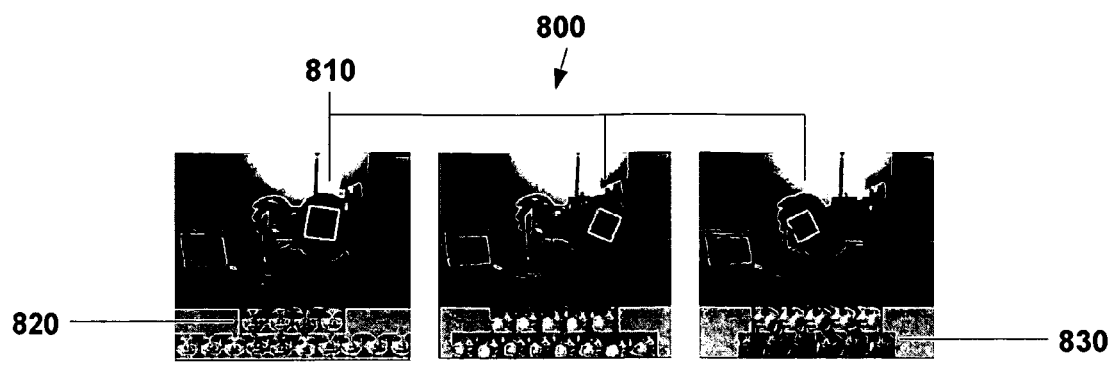
FIG. 8 illustrates partial results of one experimental application of one embodiment of the present invention.
Figure 9:
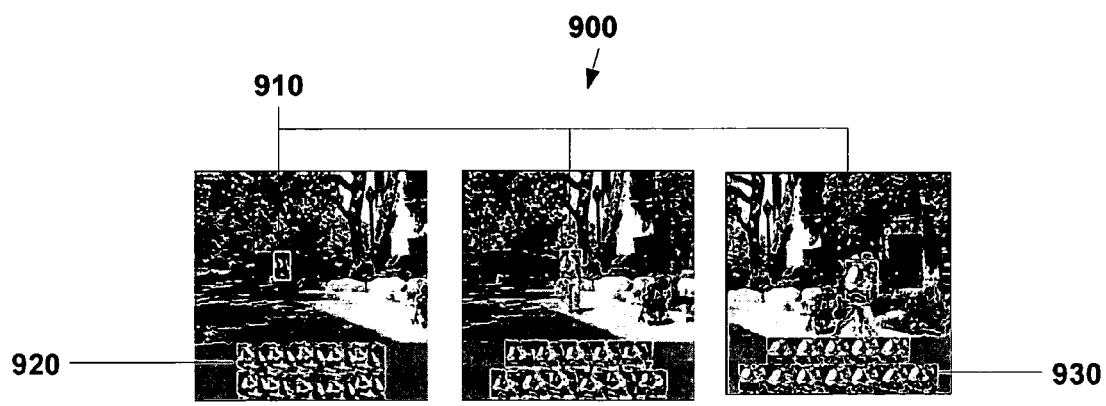
FIG. 9 illustrates partial results of another experimental application of one embodiment of the present invention.

FIGS. 8 and 9 show samples of some tracking results enclosed with rectangular windows 810 and 910. There are two rows of small images below each main video frame. The first row 820/920 shows the sampled images in the current frame that have the largest likelihoods of being the target locations according the discriminative-generative model (DGM). The second row 830/930 shows the sample images in the current video frame that are selected online for updating the DGM. The results in FIG. 8 show that the tracking algorithm successfully tracks targets undergoing pose and lighting change. FIG. 9 shows successful tracking in the presence of significant variation in pose, lighting and shadows. These two sequences were tested with a conventional view-based eigentracker and a template-based method. A description of this can be found in M. J. Black and A. D. Jepson, Eigentracking: Robust matching and tracking of articulated objects using view-based representation, *Proceedings of the Fourth European Conference on Computer Vision*, LNCS 1064, Springer Verlag, 1996, which is incorporated herein by reference in its entirety. The results show that such methods do not perform as well as the DGM-based method, as the former do not update the object representation to account for appearance change.

According to another embodiment of the present invention, a Fisher Linear Discriminant (FLD) projects image samples onto a lower-dimensional subspace. Within the lower-dimensional space, the within-class scatter matrix is minimized while the between-class matrix is maximized, as discussed above with regard to the embodiment based on the discriminative-generative model. The distribution of the background class is modeled by multiple Gaussian distributions or by a single Gaussian distribution. Preferably, one class models the target object and multiple classes model the background. According to one embodiment, one class per image sample models the background class. The FLD distinguishes samples of the object class from samples of the background classes.

Let $X_i = \{x_1^i, \ldots, x_{Ni}^i\}$ be samples from class i. The FLD computes an optimal projection matrix W by maximizing the objective function $$J(W) = \frac{|W^T S_B W|}{|W^T S_W W|} \quad (18)$$

where $$S_B = \sum_{i=1}^{n} N_i (m_i - m)(m_i - m)^T \quad (19)$$

$$S_W = \sum_{i=1}^{n} \sum_{x \in X_i} (x - m_i)(x - m_i)^T$$

are the between- and within-class scatter matrices respectively, with $m_i$ being the mean of class i, $N_i$ being the number of samples in class i, and m being the overall mean of the samples.

Let $X = \{x_1, \ldots, x_{Nx}\}$ be samples from the object class and $Y = \{y_1, \ldots, y_{Ny}\}$ be samples from the background class. Treating each sample of the background as a separate class, there are $N_y + 1$ classes with $X_1 = X$ and $X_i = \{y_{i-1}\}, i = 2, \ldots$. $N_y + 1$. Except for $X_1$, every class has exactly one sample. Hence, $m_i = y_{i-1}$ when $i \neq 1$. Applying these relationships to equations (18) and (19) gives $$S_B = N_x (m_1 - m)(m_1 - m)^T + \sum_{i=1}^{N_y} (y_i - m)(y_i - m)^T \quad (20)$$

$$S_W = \sum_{x \in X_1} (x - m_1)(x - m_1)^T$$

Now denote $m_x$ and $m_y$ as the means, and $C_x$ and $C_y$ as the covariance matrices, of samples in X and Y. By applying the fact that $$m = \frac{N_x}{N_x + N_y} m_x + \frac{N_y}{N_x + N_y} m_y \quad (21)$$

the between-class and within-class scatter matrices can be written as $$S_B = N_y C_y + \frac{N_x N_y}{N_x + N_y} (m_x - m_y)(m_x - m_y)^T \quad (22)$$

$$S_W = N_x C_x$$

Figure 10:
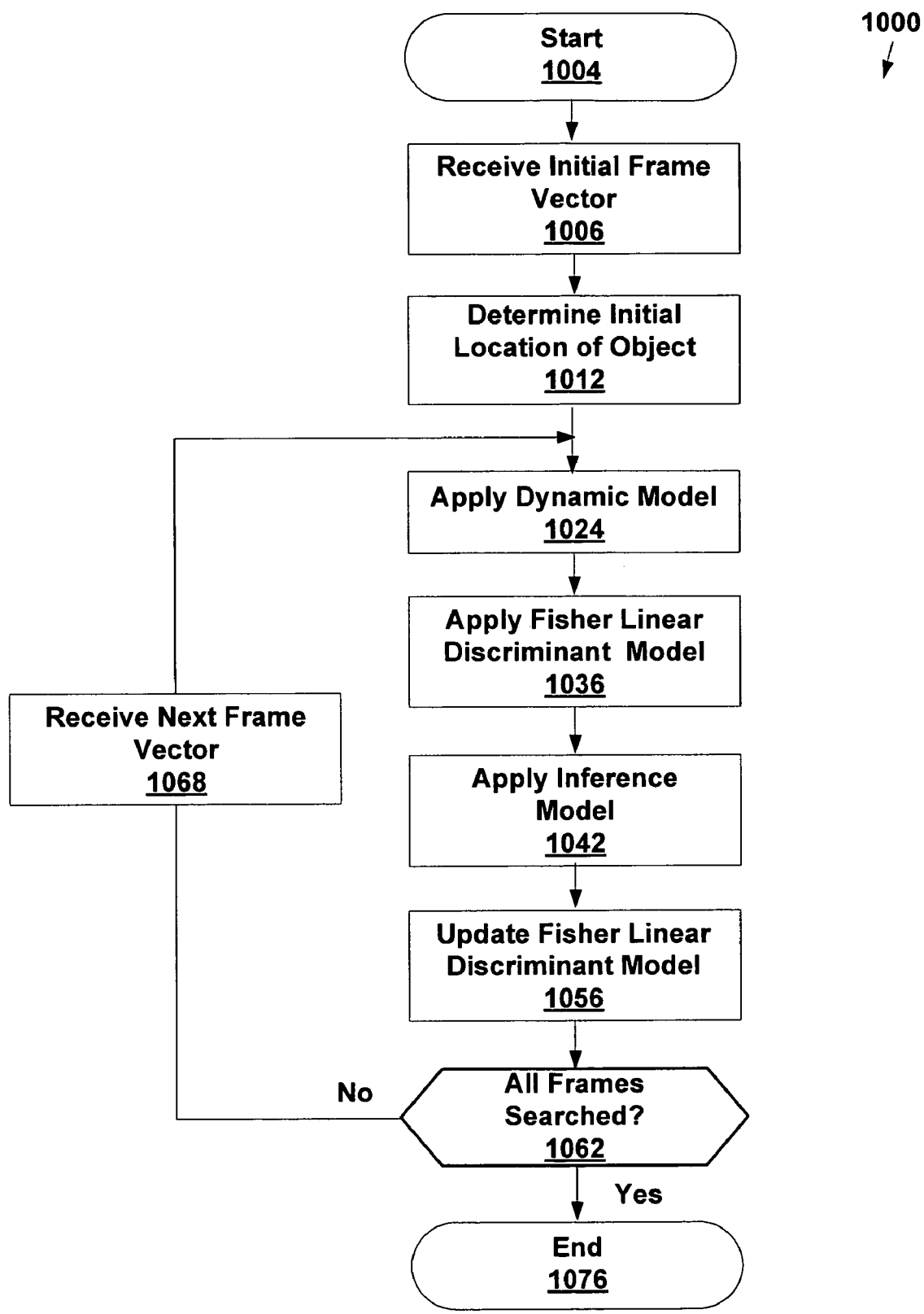
FIG. 10 is a flowchart illustrating another embodiment of the method of the invention.

Referring now to FIG. 10, a method for visual tracking corresponding to this embodiment is depicted. An initial frame vector is received 1006. The characteristics of this frame vector are as discussed above in connection with step 206. The initial location of the target object is next determined 1012. This may be accomplished as discussed above regarding step 212. This method initially classifies the target and background using samples in the first video frame. Starting at the first video frame, a set of motion parameters specifies a window that defines the initial target object location, as discussed above regarding step 224. The image portion inside that window is preferably an initial example for the object class.

A dynamic model is next applied 1024 to predict $s_{t+1}$, the object's location at time t+1, as discussed above in connection with step 224. A small perturbation is applied to the window representing the object class and the corresponding image region is cropped, e.g., a portion of the region specified by the window is taken out. A larger set of samples is thus obtained that emulates possible variations of the target object class over the interval from time t to t+1. Alternately, applying a larger perturbation provides samples of the non-target background classes. For example, $n_0$ (e.g., 500) samples may be drawn, corresponding to a set of cropped images at time t+1. These images are then projected onto a low-dimensional space using projection matrix W. It is assumed that object images in the projected space are governed by Gaussian distributions. An inference model is next applied 1042. Of the $n_0$ samples drawn, this model determines the image that has the smallest distance to the mean of the projected samples in the projection space. This distance is equivalent to dw, as shown in FIG. 4 and discussed above regarding the discriminative-generative model. This image then is chosen as the location of the object at time t+1.

The FLD is next updated 1056. The non-selected members of the $n_0$ samples whose corresponding motion parameters are close to those of the chosen sample are selected as training examples for the object class at time t+1. Exemplars for the background class are chosen as those having small distances to the object mean in the projection space, and having motion parameters that deviate significantly from those of the chosen sample. These samples are likely to have been generated from one of the background classes, since their motion parameters significantly differ from those of the chosen sample. However, these samples appear to belong to the object class in the projection space, since they have small distances dw to the object mean, as shown in FIG. 4. Thus, these samples are useful exemplars for discriminating the object and background classes.

The FLD is further updated 1056 by finding W that minimizes J(in equation (18). This may be accomplished by solving a generalized eigenvalue problem. Since $S_W$ is a rank deficient matrix, J(W) is changed to $$J(W) = \frac{S_B}{S_W + \epsilon I} \quad (23)$$

where $\epsilon$ is a scalar having a small value. Using the sequential Karhunen-Loeve algorithm discussed above, $C_x$ and $C_y$ are approximated by $$C_x \approx U_x D_x U_x^T \text{ and } C_y \approx U_y D_y U_y^T \quad (24)$$

Now define $$A = \left[ U_y\sqrt{D_y} \quad \left|\sqrt{\frac{N_xN_y}{N_x+N_y}}(m_x-m_y)\right| \right]^T \quad (25)$$

$$B = \left[ U_x\sqrt{D_x} \quad |\sqrt{\epsilon}\,I| \right]^T$$

It can be shown that $$S_B = A^T A \text{ and } S_w + \epsilon I = B^T B \quad (26)$$

The desired value of W is found by applying equations (14) and 15) as discussed above, with W substituted for V.

Returning to FIG. 10, steps 1062 and 1068 are applied in the manner discussed above regarding steps 262 and 268, respectively.

The tracking algorithm with FLD was tested with a face-tracking experiment. Videos including a human subject's face and exhibiting illumination change and pose variations were recorded. All image sequences consisted of 320×240 pixel grayscale videos, recorded at 30 frames/second and 256 gray-levels per pixel. For initialization, 100 exemplars for the target class and 500 exemplars of the background classes were used to compute the FLD. These sample sizes are chosen as a compromise. The more positive and negative examples used, the better the results. However, more computation is required as the number of examples increases. The number of negative examples is preferably larger than the number of positive examples, since preferably more than one class is used for the negative examples. The FLD was incrementally updated every five frames. During tracking, 5 new target object and background examples were added at each frame, and the previously-used examples were retained.

Figure 11:
FIG. 11 illustrates partial results of another experimental application of one embodiment of the present invention.
Figure 12:
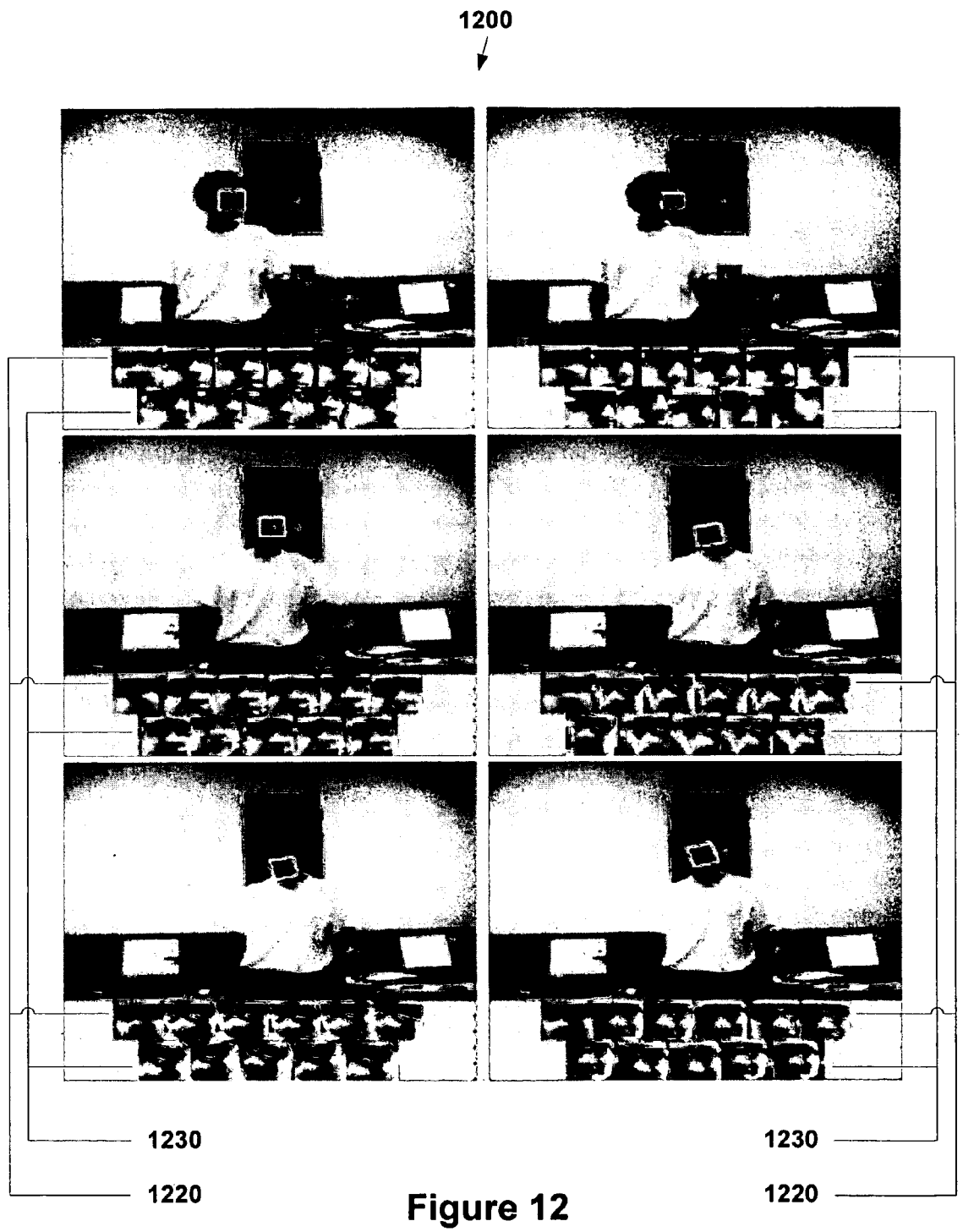
FIG. 12 illustrates partial results of another experimental application of one embodiment of the present invention.

FIGS. 11 and 12 show results of the experiments. There are two rows of small images below each main video frame. The first rows 1120/1220 show the current mean of the object classes followed by the five new object image examples collected in the respective frame. The second rows 1130/1230 show the new background examples collected in the respective frame. As shown, tracking is stable despite sharp illumination and pose changes and variation in facial expression.

Advantages of the present invention as applied to visual tracking include improved tracking accuracy and computational efficiency relative to conventional methods. Since the visual tracking models continually adapt, large appearance variations of the target object and background due to pose and lighting changes are effectively accommodated.

Those of skill in the art will appreciate still additional alternative structural and functional designs for a discriminative-generative model and a Fisher Linear Discriminant model and their applications through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

The invention claimed is:

1. A computer-implemented method for tracking a location of an object within a sequence of digital image frames, the method comprising:

using a computer processor to perform steps of:
receiving a first image vector representing a first image frame within the sequence of digital image frames;
determining an initial location of the object in said first image frame from said first image vector;
applying a dynamic model to said first image vector to predict motion of the object between the first image frame and a successive image frame and determine at least one predicted location of the object in the successive image frame within the sequence of digital image frames;
projecting samples from the at least one predicted location of the object in the successive image frame to a low dimensional projection space according to projection parameters;
applying a classification model to the projected samples of said successive image frame, the classification model applied in the low dimensional projection space and classifying each of the projected samples as one of a foreground object type and a background type;
applying an inference model to the classified samples in the low dimensional projection space to predict a most likely location of the object resulting from motion of the object between the first image frame and the successive image frame of the sequence of digital image frames; and
updating the projection parameters based on the most likely location of the object.

2. The method of claim 1, wherein said dynamic model represents a windows position, an angular orientation, a width and a height of the object.

3. The method of claim 1, wherein said inference model determines a distance from said successive image vector to a mean of said foreground object type.

4. The method of claim 1, wherein said classification model comprises a Fisher Linear Discriminant model.

5. The method of claim 1, wherein said background type comprises a single class.

6. The method of claim 1, wherein said background type comprises multiple classes.

7. The method of claim 1, wherein said background type comprises a number of classes equal to the number of images in the set of digital images.

8. A computer system for tracking the location of an object within a sequence of digital image frames, the system comprising:

means for receiving a first image vector representing a first image frame within the sequence of digital image frames;
means for determining the an initial location of the object in said first image frame from said first image vector;
means for applying a dynamic model to said first image vector to predict motion of the object between the first image frame and a successive image frame and determine at least one predicted location of the object in the successive image frame within the sequence of digital image frames;
means for projecting samples from the at least one predicted location of the object in the successive image frame to a low dimensional projection space according to projection parameters;
means for applying a classification model to the projected samples of said successive image frame, the classification model app lied in the low dimensional projection space and classifying each of the projected samples as one of a foreground object type and a background type;

means for applying an inference model to the classified samples in the low dimensional projection space to predict a most likely location of the object resulting from motion of the object between the first image frame and the successive image frame of the sequence of digital image frames; and means for updating the projection parameters based on the most likely location of the object.

9. The system of claim 8, wherein said means for applying a dynamic model comprises means for representing a windows position, an angular orientation, a width and a height of the object.

10. The system of claim 8, wherein said means for applying an inference model comprises means to determine a distance from said successive image vector to a mean of said foreground object type.

11. The system of claim 8, wherein said classification model is a Fisher linear Discriminant model.

12. The system of claim 8, wherein said background type comprises a number of classes equal to the number of images in the set of digital images.

13. An image processing computer system for tracking the location of an object within a sequence of digital image frames, the image processing computer system comprising:

an input module for receiving data representative of the sequence of digital image frames;

a memory device coupled to said input module for storing said data representative of the sequence of digital image frames;

a processor coupled to said memory device for iteratively retrieving the data representative of sequence of digital image frames, said processor configured to:

apply a dynamic model to said first image vector to predict motion of the object between the first image frame and a successive image frame and determine at least one predicted location of the object in the successive image frame within the sequence of digital image frames;

project samples from the at least one predicted location of the object in the successive image frame to a low dimensional projection space according to projection parameters;

apply a classification model to the projected samples of said successive image frame, the classification model applied in the low dimensional projection space and classifying each of the projected samples as one of a foreground object type and a background type;

apply an inference model to the classified samples in the low dimensional projection space to predict a most likely location of the object resulting from motion of the object between the first image frame and the successive image frame of the sequence of digital image frames; and update the projection parameters based on the most likely location of the object.

14. The system of claim 13, wherein said dynamic model represents a windows position, an angular orientation, a width and a height of the object.

15. The system of claim 13, wherein said inference model determines a distance from said successive image vector to a mean of said foreground object type.

16. The system of claim 13, wherein said classification model is a Fisher linear Discriminant model.

17. The method of claim 13, wherein said background type comprises a number of classes equal to the number of images in the set of digital images.

18. The system of claim 8, wherein said background type comprises a single class.

19. The system of claim 8, wherein said background type comprises multiple classes.

20. The system of claim 13, wherein said background type comprises a single class.

21. The system of claim 13, wherein said background type comprises multiple classes.

* * * * *

UNITED STATES PATENT AND TRADEMARK OFFICE
CERTIFICATE OF CORRECTION

| | | |
|---|---|---|
| PATENT NO. | : 7,650,011 B2 | Page 1 of 1 |
| APPLICATION NO. | : 11/179280 | |
| DATED | : January 19, 2010 | |
| INVENTOR(S) | : Ming-Hsuan Yang and Ruei-Sung Lin | |

It is certified that error appears in the above-identified patent and that said Letters Patent is hereby corrected as shown below:

Title Page

(73) Assignee: delete "Inc." and insert --Ltd.--.

Signed and Sealed this
Nineteenth Day of January, 2016

Michelle K. Lee
*Director of the United States Patent and Trademark Office*